May 20, 1930. J. C. CROCKER 1,759,098
WHEEL CHUCK
Filed Jan. 30, 1926 3 Sheets-Sheet 1

May 20, 1930.  J. C. CROCKER  1,759,098
WHEEL CHUCK
Filed Jan. 30, 1926  3 Sheets-Sheet 3

Inventor:
John C. Crocker
By Munday, Clarke & Carpenter

Patented May 20, 1930

1,759,098

UNITED STATES PATENT OFFICE

JOHN C. CROCKER, OF PITTSBURGH, PENNSYLVANIA

WHEEL CHUCK

Application filed January 30, 1926. Serial No. 84,964.

This invention relates to means for clamping a car wheel or other piece to be worked upon, to a rotatable chuck of a lathe, rotating table of a boring mill, or similar member. While the embodiment of the invention shown on the drawing is illustrated in connection with the manufacture of car wheels, it will be readily apparent that the invention has valuable application in other and different connections.

Taking the finishing of a car wheel as an example of a general difficulty in machining and finishing various articles, particularly the heavier ones, it may be pointed out that the general practice in finishing a car wheel has been to arrange the same upon a lathe chuck or boring mill table by engaging the rim of the wheel to permit surfacing of a side of the hub and reversing the wheel and simply reengaging the rim to finish the opposite side. At some stage of the finishing of the wheel the tread must also be machined requiring a third securing of the wheel as will be readily understood.

My invention contemplates the provision of means for use in securing the wheel or other article in place that all of the exposed surfaces including the rim, presented hub face, etc. may be machined without removing and repositioning the article. The invention contemplates broadly apparatus for accomplishing this and as an important feature also the provision of a new process of machining car wheels.

A principal object of the invention is commercial production of the above-noted operations and through the use of an apparatus of simple construction, easily operable and which will be devoid of delicate parts likely to require frequent repair, readjustment or replacement.

Numerous other objects and advantages of the invention will be apparent as it is better understood from the following description, which, taken in connection with the accompanying drawings, discloses a preferred embodiment thereof.

Referring to the drawings.

Figure 1:
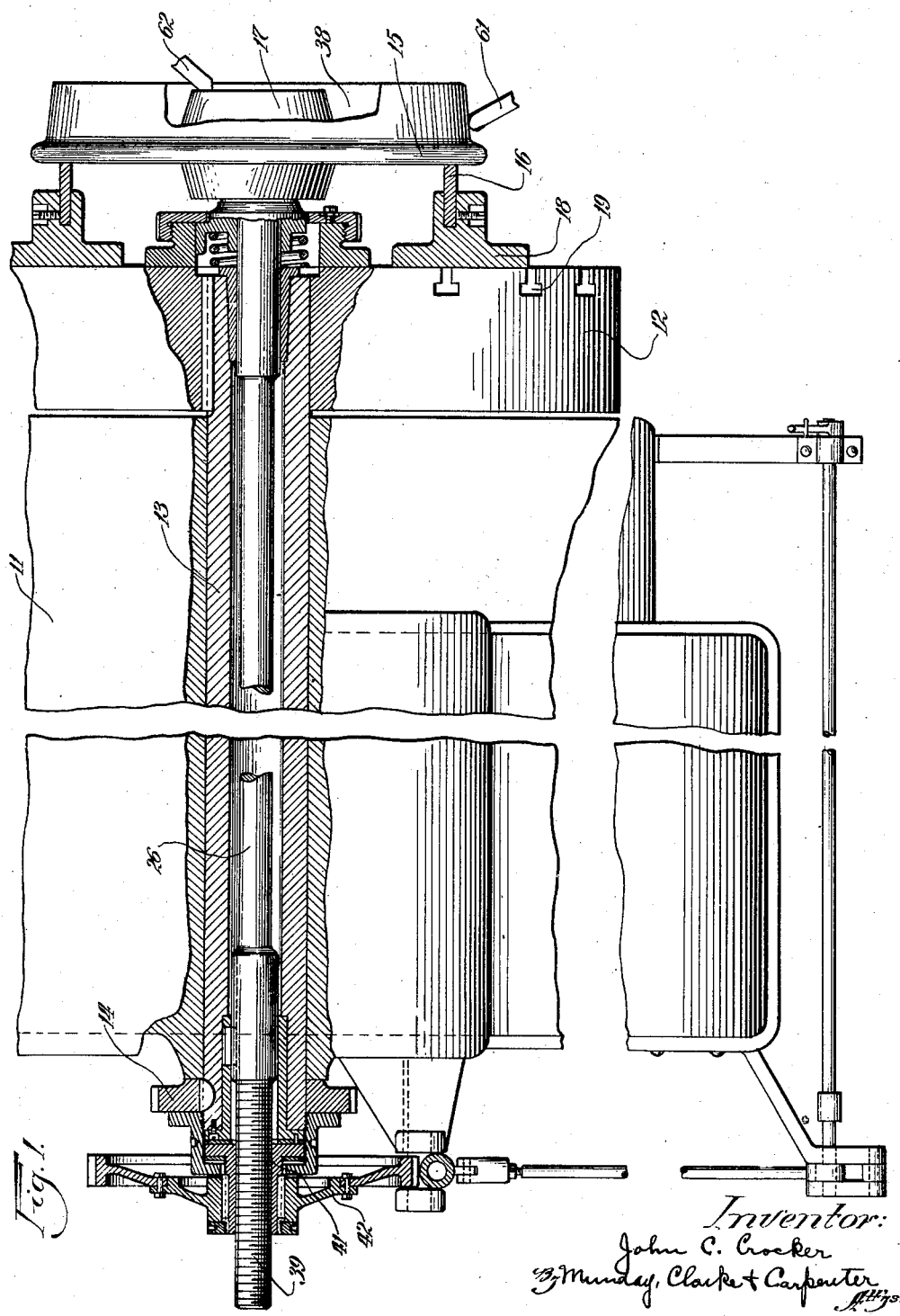
Figure 1 is a view partially in section showing so much of a lathe or boring mill as is necessary to an understanding of my present invention.
Figure 2:
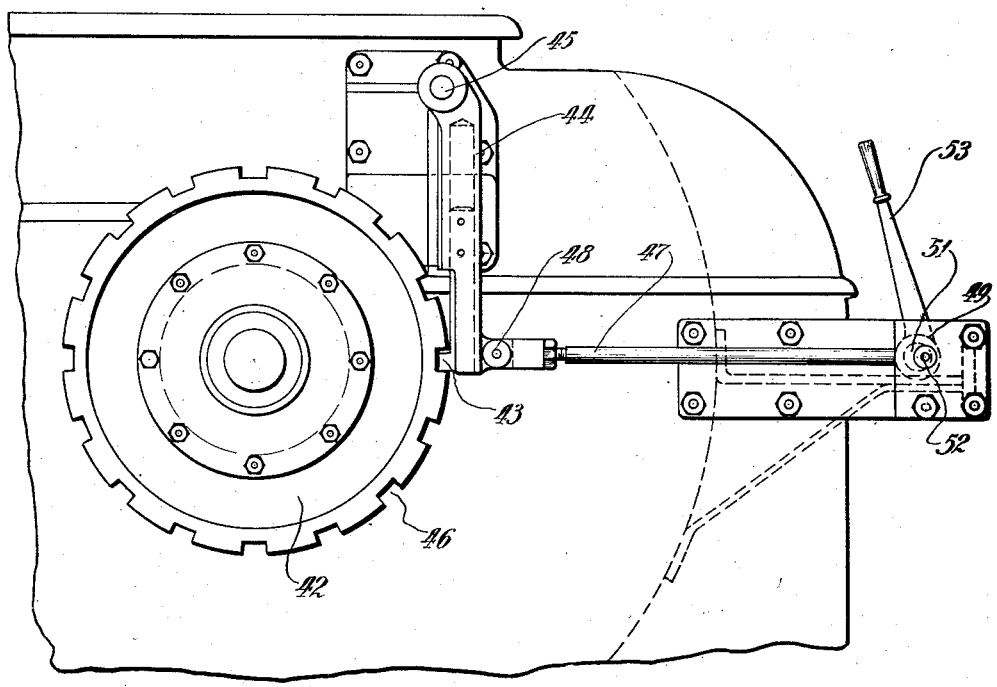
Fig. 2 is a view looking from the left in Fig. 1.
Figure 3:
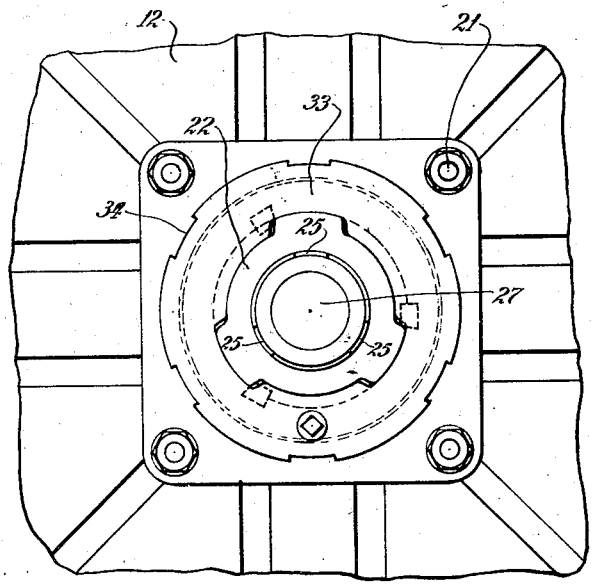
Fig. 3 is a partial view looking from the right in Fig. 1; and with the car wheel removed.

On the drawing I have shown a part of the machine, which, for the purpose of illustrating this invention, may be considered to be either a part of a lathe or a part of a boring mill or other piece of apparatus adapted to the work at hand. Referring to Figure 1, reference character 11 indicates the frame of the machine, reference character 12 the chuck, turret or table thereof which rotates upon a central hollow shaft 13 extending through the frame part 11. The end of the shaft opposite the rotating member or turret 12 is provided with a gear 14 for imparting rotation to the member in the operation of the machine.

A car wheel 15 is shown secured upon the rotating member 12 and is held against serrated dogs 16 by a device engaging within the hub 17 of the car wheel and pulling the car wheel against the dogs. The dogs 16 are mounted in carriers 18 secured in slots 19 by bolts 21 in the usual manner.

The device mentioned for holding the car wheel to the dogs comprises a cage 22 mounted for slight axial movement in a bearing 23 positioned at the center of the rotating member 12. This cage is provided with a number of slots 24 in each of which is arranged a dog 25 adapted to move radially of the cage. A rod 26 extends through the cage and through the hollow center of the shaft 13 and is provided with a cam head 27, this head fitting within the bore 28 of the cage. Three cam slots 29 are provided in the head 27 into which the dogs 25 extend.

Figure 4:
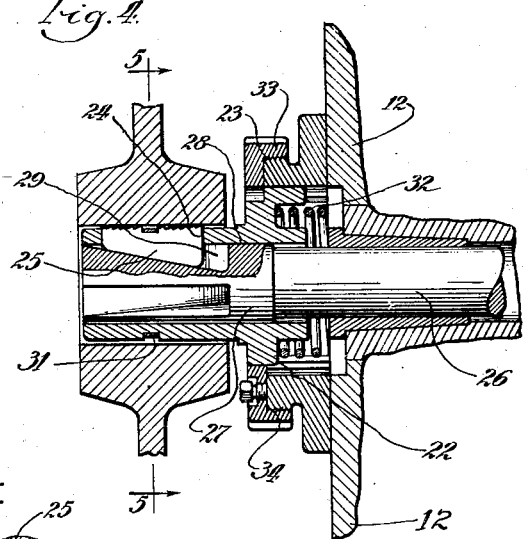
Fig. 4 is an enlarged detail in cross section showing the construction of the chuck.
Figure 5:
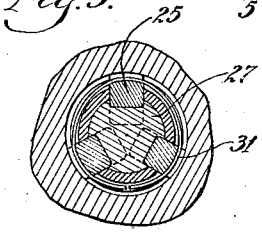
Fig. 5 is a drawing taken substantially along line 5—5 of Fig. 4.

Viewing Fig. 4 it will be noted that the slots 29 taper in depth from a shallow outer end to a deeper inner end so that when the rod is moved in the direction of the arrow in Fig. 4 the dogs are thrust laterally or radially outwardly into gripping engagement with the inner face of the bore of the car wheel. A circular spring 31 causes the dogs to follow the back inclined faces of the slots when it is desired to release the gripping action and holds them in retracted position until positively projected.

A spring 32 is arranged between the cage and the table or rotating member 12 and a housing member 33 has threaded engagement at 34 with the bearing member 23 of the cage.

In positioning the car wheel or other article the hub is inserted over the cage until the rim of the wheel 38 rests upon the dog 16; thereupon the rod 26 is moved axially and to the left (viewing Fig. 1) by a mechanism that will now be described and which is brought into action by starting the lathe or other piece of apparatus. The end 39 away from the work is threaded and extends beyond the shaft 13. This end is engaged in a nut or threaded collar 41 to which is secured a notched wheel 42 adapted for engagement by a lock lug 43 upon a lever 44 pivoted at 45 on the frame part 11 and adapted to enter into notches 46 in the edge of the wheel 42. The movement of the lug 43 is controlled through a rod 47 pivoted at 48 to the lever 44 and having at its end an eccentric strap 49 embracing an eccentric 51 mounted for rotation about a shaft 52 through the movement of a lever 53 carried upon the end of said shaft 52 and in position for convenient operation by the mechanic doing the work.

After the wheel is positioned rotation is started with the lug 43 in engagement with the presented notch 46 and turning of the turret with the correspoding turning of the rod causes the rod to move axially as it screws its way through the collar 41. This movement continues until the parts are tight and the belt driving the apparatus slips. Thereupon the lug 43 is moved out of engagement with the wheel 42 and the wheel is tightly gripped by the dogs 25 and 16, the dogs 16 imparting the rotative movement to the wheel. Thus arranged the machine work may be done as indicated by the tools 61 and 62 upon the tread and hub face of the wheel without altering or changing the wheel mounting.

In machining the wheel it is therefore only necessary to arrange the wheel in the apparatus in two different positions, namely, one presenting each hub face outwardly, and machining the tread in one or the other of such positions. The force of the spring 32 is sufficient to cause the dogs 25 to grip the wheel and pull the wheel against the dogs 16 as the rod is screwed tight.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine having a rotating work-holding member, as a lathe or boring mill, the combination of a rotating work-carrying member, a clamping device arranged at the axis of said member and adapted to extend into the article being worked upon, said clamping device comprising laterally movable clamping dogs and a retracting spring embracing said dogs for returning the dogs to non-clamping position after completion of the work, and a locking member engaging said carrying member and adapted to co-operate therewith to move said clamping device to operative position.

2. In a machine having a rotating work-holding member, as a lathe or boring mill, the combination of a rotating work-carrying member, a clamping device arranged at the axis of said member and adapted to extend into the article being worked upon, said clamping device comprising laterally movable clamping dogs and a retracting spring embracing said dogs for returning the dogs to non-clamping position after completion of the work, and a locking member engaging said carrying member and adapted to co-operate therewith to secure said clamping device in operative position.

3. In a machine having a rotating work-holding member, the combination of a rotating work-holding member, a clamping device arranged centrally of said work-holding member and axially movable into work-holding relation with the article to be worked upon, a power-driven rotating member for rotating said work-holding member, and a manually operable device for locking said axially movable clamping device to said power-driven rotating member to move said clamping device axially into work-holding position.

4. In a machine having a rotating work-holding member, a clamping device having a threaded portion and rotatable with said work-holding member and axially movable thereof into clamping position, a member in threaded engagement with the threaded portion of said clamping device, and means halting rotation of said threaded member for screwing upon said clamping device as the work-holding member rotates to move the clamping device axially into clamping position.

JOHN C. CROCKER.